United States Patent [19]
Gee

[11] Patent Number: 5,404,982
[45] Date of Patent: Apr. 11, 1995

[54] CLUTCH PEDAL DASHPOT DRIVELINE TORQUE LIMITER

[75] Inventor: Thomas A. Gee, Allen Park, Mich.

[73] Assignee: Eaton Corporation, Cleveland, Ohio

[21] Appl. No.: 27,065

[22] Filed: Mar. 4, 1993

[51] Int. Cl.6 .............................................. B60K 23/02
[52] U.S. Cl. ................................. 192/109 D; 60/533; 92/85 B
[58] Field of Search ................ 192/109 D, 109 F; 60/533; 92/85 B, 143

[56] References Cited

U.S. PATENT DOCUMENTS

| | | | |
|---|---|---|---|
| 1,165,230 | 12/1915 | Degen | 192/109 D |
| 1,176,244 | 3/1916 | Redlich | 192/109 D X |
| 1,374,413 | 4/1921 | Webb | 192/109 D X |
| 1,435,732 | 11/1922 | Pierce | 192/109 D |
| 1,692,390 | 11/1928 | Smith | 192/109 D X |
| 1,764,752 | 6/1930 | Rodger | 192/109 D |
| 1,996,256 | 4/1935 | Price et al. | 92/85 B X |
| 3,866,727 | 2/1975 | Myers | 92/143 X |
| 3,963,107 | 6/1976 | Bolger | 192/109 D |
| 4,617,885 | 10/1986 | Oshiro et al. | |
| 4,632,014 | 12/1986 | Endo | |
| 4,668,207 | 5/1987 | Koshimo | |
| 4,693,354 | 9/1987 | Umeyama et al. | |
| 4,779,713 | 10/1988 | Tomala et al. | 192/88 A |
| 4,926,994 | 5/1990 | Koshizawa et al. | |
| 4,947,972 | 8/1990 | Lea | |
| 5,009,299 | 4/1991 | Seegers | 192/85 C |
| 5,009,301 | 4/1991 | Spitler | |
| 5,127,506 | 7/1992 | Müller et al. | 192/85 C |

FOREIGN PATENT DOCUMENTS

| | | |
|---|---|---|
| 097594 | 1/1984 | European Pat. Off. . |
| 399399 | 11/1990 | European Pat. Off. . |
| 2440039 | 3/1976 | Germany . |
| 52-75731 | 6/1977 | Japan ............... 192/109 F |
| 2125135 | 2/1984 | United Kingdom . |

*Primary Examiner*—Richard M. Lorence
*Attorney, Agent, or Firm*—Brooks & Kushman

[57] ABSTRACT

A clutch pedal dashpot for controlling the rate torque is applied to a vehicular driveline during the coupling of an engine to a transmission by controlling the rate at which the clutch engages via damping clutch pedal travel. The dashpot is for use in a vehicle, such as a heavy-duty truck, which includes a clutch pedal displaced between a resting position and a depressed position. The clutch pedal dashpot includes a damper piston, coupled to the clutch pedal, for controlling the rate at which the clutch pedal returns to the first position from the second position during coupling so as to control the rate of clutch engagement, thereby controlling the rate of torque applied to the driveline.

9 Claims, 2 Drawing Sheets

CLUTCH PEDAL DASHPOT DRIVELINE TORQUE LIMITER

TECHNICAL FIELD

The present invention relates to vehicular master clutches and, more particularly, to clutch dampers for limiting the application of torque to truck driveline components.

BACKGROUND ART

Driveline component manufacturers, especially in the trucking industry, are continually being urged to improve the durability and reliability of driveline components, such as driveshafts, axles and gears. Since the best solution is not always merely one of "beefing up" the individual components, various damping devices have been conceived and are well-known in the art. Clutch damping/torque limiting devices are illustrated in U.S. Pat. Nos. 4,668,207, 4,693,354, 4,888,539, 4,947,972 and 5,009,301.

One problem of particular significance results when a truck driver overzealously engages the clutch by, for example, "side-stepping" the clutch. When a driver side-steps, the clutch pedal is depressed and a particular gear is selected. The engine is then revved up and the driver slides his foot sideways off of the clutch pedal, allowing the clutch pedal to snap back to the resting position. This results in a very rapid clutch engagement and application of torque to the driveline, inducing vibrations and oscillations into the driveline. The driveline components are seriously stressed and failure is hastened if the rate of torque application is faster than the natural frequency of the driveline. Specifically, unnecessary stress occurs when the driveline torque input has major harmonic content at frequencies at or above the lowest natural frequency of the driveline. Thus, if the rate of torque application is at or below the natural frequency, the driveline is not shocked.

It is therefore desirable to prevent overzealous engagement of a clutch by controlling the rate of torque applied to the driveline in a reliable, durable and cost-effective way.

DISCLOSURE OF THE INVENTION

It is an object of the present invention to provide a system for preventing overzealous engagement of a clutch by controlling the rate of torque applied to the driveline.

It is a further object of the present invention to provide a clutch pedal dashpot driveline torque limiter for preventing overzealous engagement of a clutch by controlling the rate of torque applied to the driveline.

In carrying out the above objects, and other objects and features of the present invention, there is provided a clutch pedal dashpot for controlling the rate torque is applied to a vehicular driveline during coupling of an engine to the driveline. The clutch pedal dashpot is for use in a vehicle including a remote clutch pedal and a clutch actuating mechanism for controlling a clutch's torque coupling of the engine to the driveline, wherein the clutch pedal is displaced between a first position at which the clutch is engaged and a second position at which the clutch is disengaged, relative to the floor of the vehicle operator's cab, during coupling. A pedal operated hydraulic master cylinder coupled to a slave cylinder is one example of this type of actuator.

In one embodiment, the clutch pedal dashpot comprises damper means, coupled to the clutch pedal for controlling the rate at which the clutch pedal returns to the first position from the second position during coupling so as to control the rate of clutch engagement, thereby controlling the rate of torque applied to the driveline.

In a preferred construction, the damper means is a damper piston and the clutch pedal dashpot further comprises a damper piston stop member for limiting travel of the damper piston to only a portion of the possible travel during displacement of the clutch pedal from the first position to the second position. The clutch pedal dashpot also preferably comprises bias means for biasing the damper piston against the stop member during displacement of the clutch pedal from the first position to the second position.

Also preferably, the damper piston sealingly cooperates with a damper piston housing to create a chamber, and the piston housing includes a check valve means for allowing air to be drawn into the chamber as the pedal is displaced from the first position to the second position and for preventing or impeding air from being expelled from the chamber as the pedal is displaced from the second position to the first position. The piston housing preferably includes a passage for allowing air to be drawn into the chamber as the pedal is displaced from the first position to the second position and for allowing air to be expelled from the chamber as the pedal is displaced from the second position to the first position.

A method for controlling the rate torque is applied to the driveline during coupling is also provided.

The advantages accruing to the present invention are numerous. For example, the present invention successfully limits the rate that engine torque is applied to a driveline even when the vehicle operator tries to overzealously engage the clutch. As a result, driveline components can be designed to withstand smaller torques and fewer driveline components will fail, resulting in a substantial cost savings.

The above objects and other objects, features and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1A:
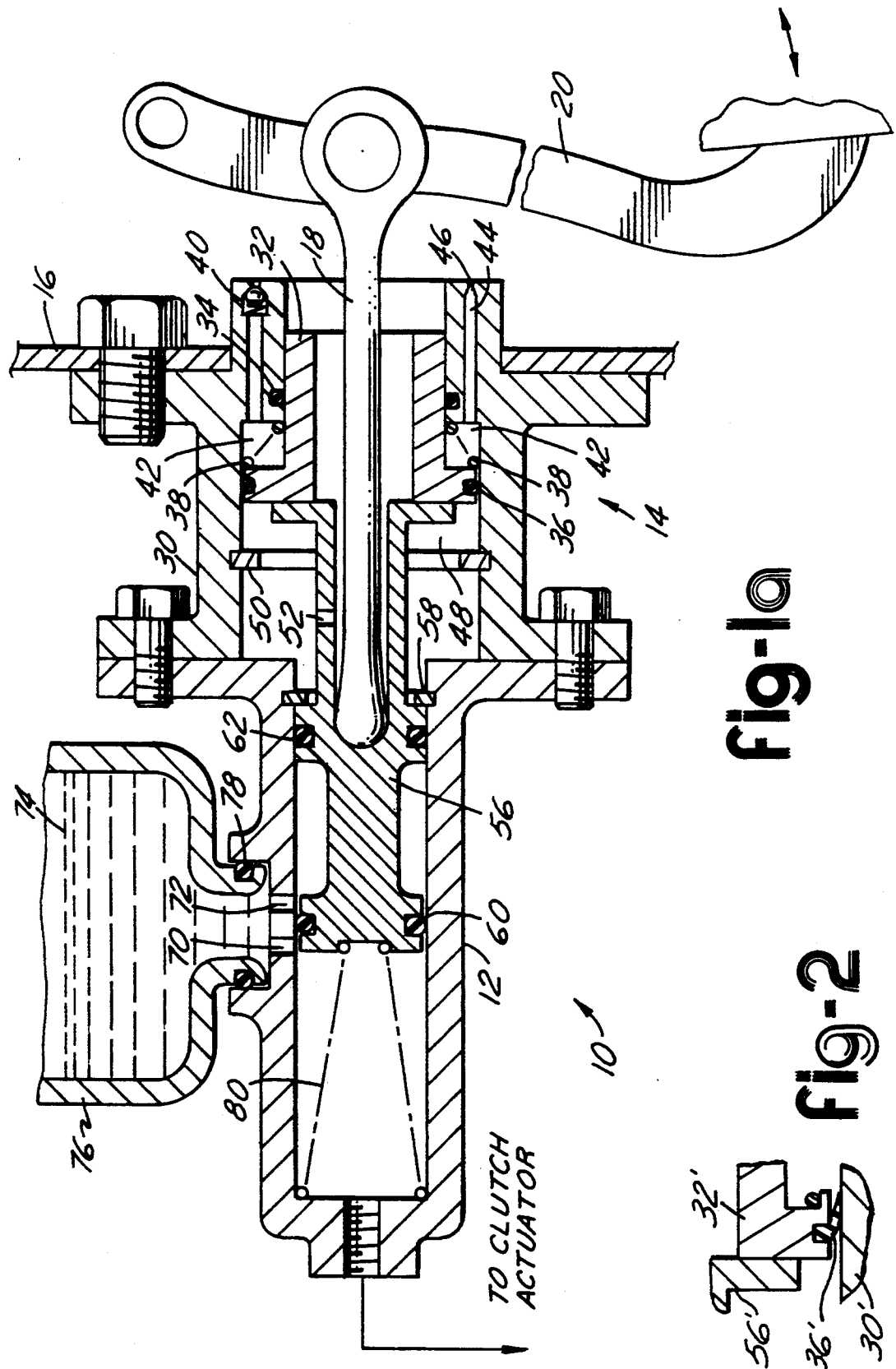
FIG. 1A is a cross-section of a first embodiment of the clutch pedal dashpot driveline torque limiter of the present invention.

Referring now to FIG. 1A, there is shown a cross-section of a clutch pedal dashpot 10 of the present invention for limiting the rate torque is applied to a driveline of a vehicle, such as a heavyduty truck, which is not specifically illustrated for the sake of clarity. In the preferred embodiment, the clutch pedal dashpot 10 includes a master clutch cylinder 12 and a dashpot assembly shown generally by reference numeral 14. As shown, the dashpot assembly 14 is fixedly attached to the master clutch cylinder 12 and a mounting wall 16, such as the firewall of the truck. As shown in the drawings and described in greater detail below, the dashpot assembly 14 is designed to receive a push rod 18, which is pivotally connected to a clutch pedal 20.

With continuing reference to FIG. 1A, the dashpot assembly 14 preferably includes a substantially hollow piston housing 30 and a damper piston 32 disposed within the housing. The damper piston 32 slides axially within the piston housing 30 between a rest position and a reset position based on the displacement of the clutch pedal 20 between a first, or resting, position at which point the clutch is engaged and a second, or depressed, position at which point the clutch is disengaged. As shown, the damper piston 32 is generally hollow and preferably generally T-shaped so as to create a chamber 42, between the piston and the housing, within which a reset spring 38 is disposed.

As best shown in FIG. 1A, the piston housing 30 includes a check valve assembly shown generally by reference numeral 40. In the preferred embodiment, the check valve assembly 40 includes a one-way check valve and passage which allows air to be drawn into the chamber 42 as the clutch pedal 20 is displaced from the resting position to the depressed position (i.e. as the damper piston 30 is axially displaced toward the left). As shown, the check valve assembly 40 also prevents or impedes air from being expelled from the chamber 42 as the clutch pedal 20 returns to the resting position from the depressed position (i.e. as the damper piston 30 is axially displaced toward the right). Preferably, the check valve and passage are sized so as to restrict the flow of air drawn into the chamber 42 to a first rate.

The piston housing 30 also preferably includes a passage 44 in fluid communication with the chamber 42. As shown, the passage 44 extends from the chamber 42 through the housing 30 and is in fluid communication with the atmosphere through an orifice 46. It should be noted that the passage 44 and the orifice 46 allow air to be both drawn into and expelled from the chamber as the clutch pedal 20 is displaced between the resting position and the depressed position. Most preferably, the passage 44 and orifice 46 are sized so as to restrict the flow of air drawn into and expelled from the chamber to a second rate as the clutch pedal 20 is displaced between positions, the second rate being slower than the first rate at which air is allowed to be drawn into the chamber 42 via the check valve assembly 40. The piston housing 30 and damper piston 32 preferably include O-rings 34 and 36, respectively, which provide a seal between the housing and piston.

Figure 2:
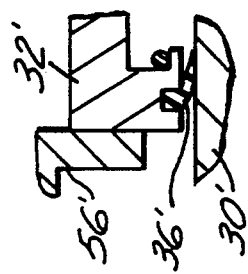
FIG. 2 is a cut-away of the clutch pedal dashpot shown in FIG. 1A, illustrating the use of a lip seal instead often O-ring.

Referring now to FIG. 2, there is shown a cut-away of the clutch pedal dashpot shown in FIG. 1A, illustrating the use of a lip seal 36' in place of the O-ring 36. The lip seal, as is known, folds back and forth between the housing 30' and the damper piston 32', allowing air to be transferred between the chamber 42 and the chamber 48 as the damper piston is translated axially within the housing. It should be appreciated that with the use of the lip seal 36', the check valve and/or the passage could be eliminated. It should also be appreciated that the clutch pedal dashpot could utilize different combinations of the lip seal, the check valve and the passage, so long as the desired result is achieved: that the damper piston be displaced from the rest position to the reset position when the clutch pedal is depressed at a rate which exceeds the rate at which the damper piston returns to the rest position when the clutch pedal is released. This slows the rate of clutch engagement and, therefore, controls the rate torque is applied to the driveline.

Axial displacement of the damper piston 32 within the piston housing 30 is restricted by a first piston stop member, or key, 50 so that the position of the damper piston relative to the clutch pedal 20 is fixed. It should be appreciated that as the clutch pedal 20 is depressed, the damper piston 32 is displaced toward the left to the key 50 by the reset spring 38. The speed with which the damper piston 32 moves is governed not only by the spring constant of the spring 38, but also by the rate at which air is drawn into the chamber 42.

With continuing reference to FIG. 1A, the master clutch cylinder 12 includes an extended piston 56 disposed within the master clutch cylinder 12. As shown, the extended piston 56 preferably receives, and is fixedly connected to, the push rod 18, such that the extended piston moves axially within the clutch pedal dashpot 10 as the clutch pedal 20 is displaced between the resting position and the depressed position. The key 50 is sized to allow the extended piston 56 to pass therethrough while still restricting axial displacement of the damper piston 32 as described above. Thus, the damper piston 32 and the extended piston 56 are coupled to each other for only a portion of the clutch pedal travel. As shown, the extended piston 56 may include an orifice, or vent, 52 which is in fluid communication with the vehicle cab, allowing clean air to be cycled in and out of the housing.

A second piston stop, or key, 58 restricts displacement of the extended piston 56 in one direction and a preload spring 80 restricts axial displacement of the extended piston in the other direction. It should be appreciated that the preload spring 80 is preferably selected so as to provide an appropriate preload force on the extended piston 56 so as to overcome the force exerted on the damper piston 32 by the reset spring 38 and return the clutch pedal 20 to the resting position once the clutch pedal is released by the vehicle operator.

As shown in FIG. 1A, a hydraulic fluid reservoir 76 provides hydraulic fluid 74 to the master clutch cylinder 12 through a pair of fluid make-up ports 70 and 72. O-ring 78 functions as a seal between the hydraulic fluid reservoir 76 and the master clutch cylinder 12. Additional sealing between the extended piston 56 and the cylinder 12 is provided by the O-rings 60 and 62.

Figure 1B:
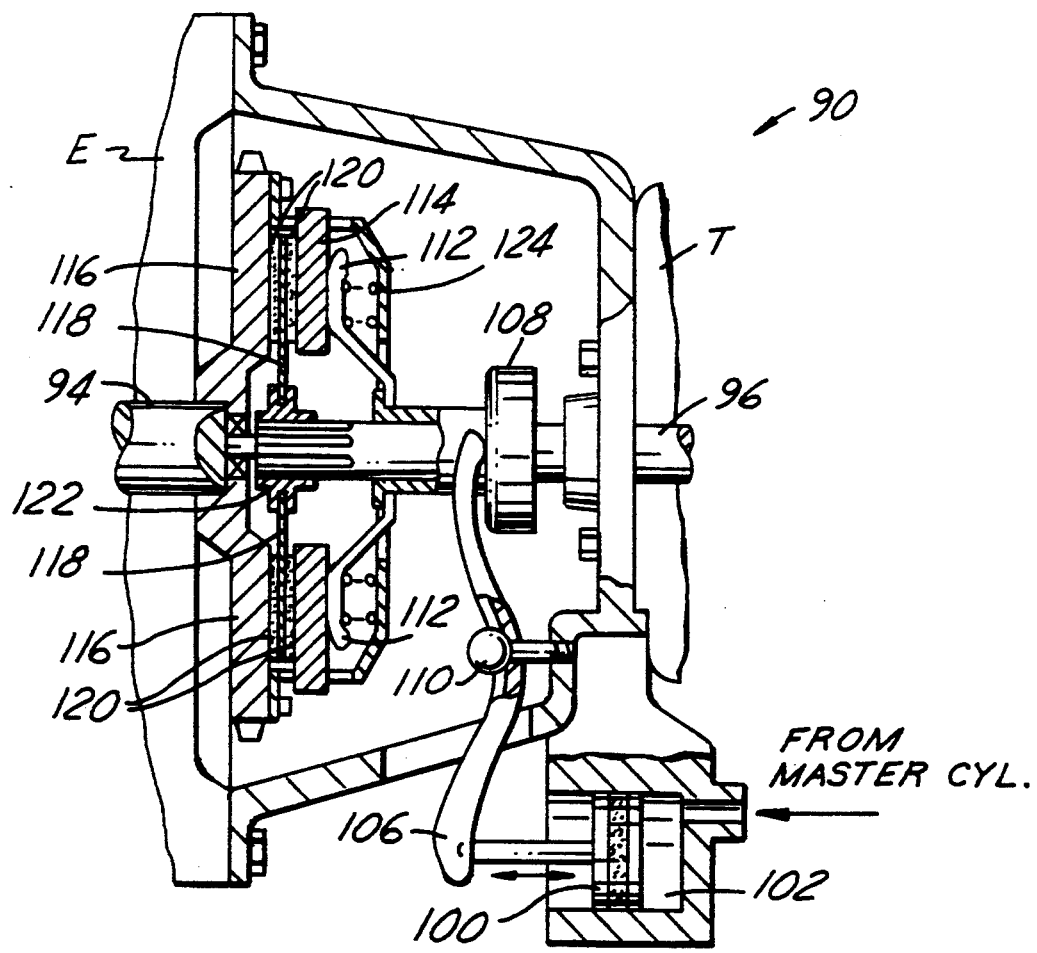
FIGURE 1B is a cross-section of a clutch mechanism for use with the clutch pedal dashpot driveline torque limiter of the present invention shown in FIG. 1.

Referring now to FIG. 1B, there is illustrated a hydraulically actuated, self-adjusting clutch mechanism shown generally by reference numeral 90. As is known, the clutch mechanism 90 is positioned between an engine E and a transmission T of a driveline and functions to couple the engine to the transmission. More specifically, the clutch mechanism 90 releasably couples the adjacent ends of an engine crankshaft 94 and a transmission input shaft 96.

As best shown in FIG. 1B, the clutch mechanism 90 includes a hydraulic piston 100 which is attached to a clutch release arm 106. The hydraulic piston 100 moves axially within a piston chamber 102 which is in fluid communication with the master clutch cylinder 12 shown in FIG. 1A. The clutch release arm 106 is pivotally connected to a release bearing assembly 108 through a pivot ball 110. As hydraulic fluid from the master clutch cylinder 12 fills the piston chamber 102, the hydraulic piston 106 is axially displaced. This causes the clutch release arm 106 to slide the release bearing assembly 108 along the transmission input shaft 96. As a result, pivoted release levers 112, which are coupled to the release bearing assembly 108, apply pressure to a pair of spring-loaded pressure plates 114.

Positioned between the spring-loaded pressure plates 114 and a flywheel 116, which is fixedly attached to the engine crankshaft 94 for rotation therewith, is a driven disc 118. The disc 118 is lined on both faces with friction material, shown generally by reference numeral 120. The disc 118 is free to float coaxially between the pressure plates 114 and the flywheel 116, and is carried on a hub 122 splined onto the transmission input shaft 96. As is known, this arrangement has the advantage of, in effect, doubling torque capacity of the clutch and halving the temperature of the rubbing surface during progressive engagement, thereby increasing the life of the friction material 120.

With continuing reference to FIG. 1B, since the clutch mechanism 90 is self-adjusting, when the driven disc 118 wears, the pressure plate spring force from the springs 124 forces the pressure plates 114 to move to the left, carrying the release levers 112 and the release bearing assembly 108 to the left. This in turn forces the hydraulic piston 100 deeper into the chamber 102, displacing hydraulic fluid therefrom to the fluid reservoir 76 through the master clutch cylinder 12. Therefore, clutch pedal 20 position is not significantly altered with clutch friction material wear.

With combined reference now to FIGS. 1A and 1B, it should be appreciated that as the clutch pedal 20 is depressed, the extended piston 56 is displaced toward the left, compressing the preload spring 80. Depending on how fast the clutch pedal is depressed, the extended piston 56 may separate from the damper piston 32. With the clutch pedal 20 depressed and the extended piston 56 displaced to the left, the reset spring 38 expands and displaces the damper piston 32 to the left. The speed with which the damper piston 32 moves is governed not only by the spring constant of the spring 38, but also by the rate at which air is drawn into the chamber 42.

Hydraulic fluid is forced out of the master clutch cylinder 12 of FIG. 1A and supplied to the clutch mechanism 90 of FIG. 1B. Once the clutch pedal 20 is released by the vehicle operator, the pedal begins to return to the resting position primarily due to the hydraulic fluid pressure created by the clutch pressure plate springs. Preload spring 80 is secondary to the hydraulic pressure on the piston. It is effective, after the make-up port 72 is traversed, to push the piston to the stop 58. The fluid pressure forces the extended piston 56 back toward the right. As this occurs, fluid is pushed into the clutch cylinder 12 from the clutch mechanism 90. As the pressure plate springs 124 expand, the extended piston 56 travels through the key 48 and contacts the damper piston 32, displacing it to the right, compressing the reset spring 38 and forcing air to be expelled from the chamber 42 through the passage 44 and orifice 46.

As is known, every portion of clutch pedal travel does not directly affect clutch engagement and disengagement. For example, the first portion of clutch pedal travel does not result in disengagement of the clutch due to internal clearances of clutch mechanism components. In the preferred embodiment, the dashpot 10 is designed such that the clutch begins to engage (i.e. the clutch begins to couple the engine to the driveline) when the extended piston first contacts the damper piston 32. This is commonly referred to as the "touch point" or the "point of incipient engagement." The rate of further clutch engagement, i.e. the rate at which torque is applied to the driveline, is then controlled via the reset spring 38 and the passage 44, both of which function to slow the rate at which the clutch fully engages by slowing the rate at which the clutch pedal is allowed to return to the resting position. As a result, the time rate of change of torque to the driveline is controlled, regardless of how zealously the driver attempts to engage the clutch.

Figure 3:
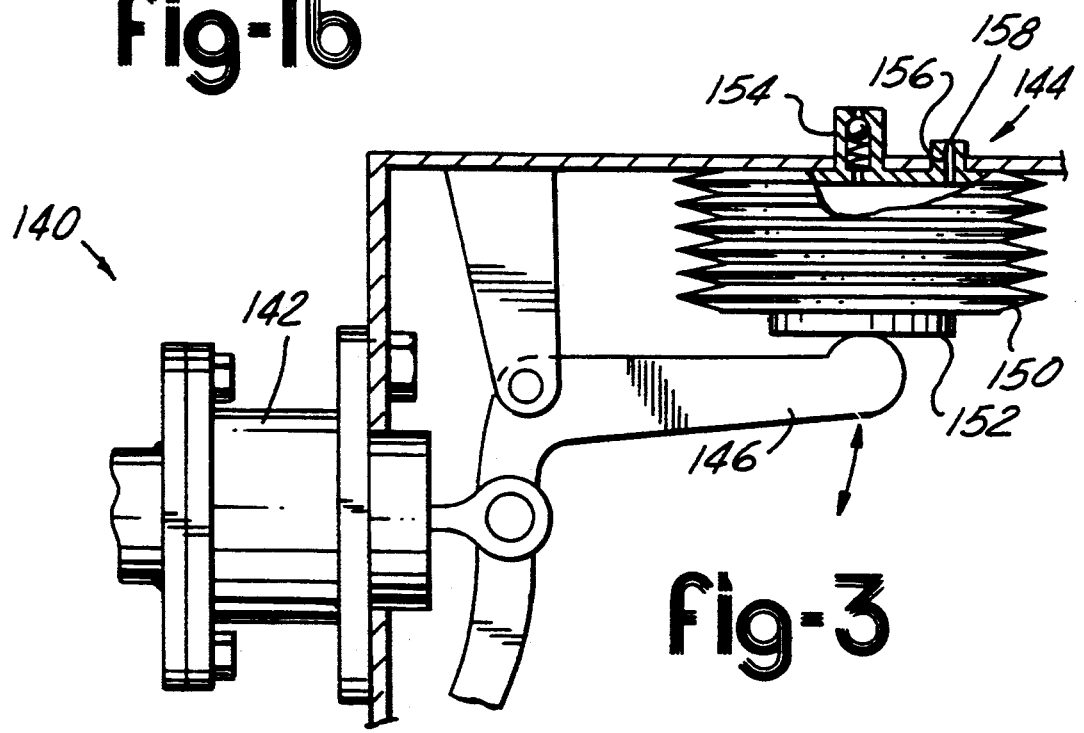
FIG. 3 is a cross-section of a second embodiment of the clutch pedal dashpot driveline torque limiter of the present invention.

Referring now to FIG. 3, there is shown a cross-section of an alternative embodiment, shown generally by reference numeral 140, of the clutch pedal dashpot driveline torque limiter of the present invention. In this embodiment, the dashpot 140 includes a master clutch cylinder 142 and a dashpot assembly shown generally by reference numeral 144. As shown, the dashpot assembly 144 is fixedly attached to the master clutch cylinder 142 so as to facilitate cooperation with the clutch pedal 146 as shown. It should be noted that the master clutch cylinder 142 may be functionally similar to the master clutch cylinder 12 described above with reference to the embodiment shown in FIG. 1A. It should be noted that alternatively, the connection between the clutch pedal and the clutch could be a self-adjusting cable system well known in the art. Regardless of the alternative utilized, the clutch engagement positions are preferably fixed relative to the clutch pedal attachment points.

The dashpot 140 of FIG. 3 preferably includes a bellows 150. The clutch pedal 146 cooperates with the bellows 150 through a pad 152 to expand and contract the bellows 150 as the vehicle operator displaces the clutch pedal between a resting position wherein the clutch is engaged and a depressed position wherein the clutch is disengaged. In the embodiment shown, air flow into and out of the bellows 150 is governed by a check valve 154 and a passage 156. As in the previous embodiment, the check valve 154 is a one-way check valve which allows air to be drawn into the bellows 150 as the clutch pedal 146 is displaced from the resting position to the depressed position, and which prevents or impedes air from being expelled from the bellows as the clutch pedal returns to the resting position from the depressed position. Preferably, the check valve 154 is sized so as restrict the flow of air drawn into the bellows 150 to a first rate.

As shown in FIG. 3, the passage 156 provides a fluid communication between the bellows 150 and the atmosphere through an orifice 158. It should be noted that the passage 156 and the orifice 158 allow air to be both drawn into and expelled from the bellows 150 as the clutch pedal 146 is displaced between the resting position and the depressed position. Most preferably, the passage 156 and orifice 158 are sized so as to restrict the flow of air expelled from the bellows 150 to a second rate as the clutch pedal is displaced between positions, the second rate being slower than the first rate at which air is allowed to be drawn into the bellows via the check valve 154.

As described above in greater detail with reference to FIGS. 1A, every portion of clutch pedal travel does not directly affect clutch engagement and disengagement. In this preferred embodiment, therefore, the dashpot 10 is designed such that the clutch begins to engage (i.e.

the clutch begins to couple the engine to the driveline) when the clutch pedal 146 begins to engage the bellows 150. The rate of further clutch engagement, i.e. the rate at which torque is applied to the driveline, is then controlled via the passage 156 and orifice 158, both of which function to slow the rate at which the clutch fully engages by slowing the rate at which air is expelled from the bellows, thereby slowing the rate at which the clutch pedal is allowed to return to the resting position. As a result, the rate of torque application to the driveline is controlled regardless of how zealously the driver attempts to engage the clutch. It should be appreciated that the embodiment shown illustrates just one way to achieve the desired result: to slow the rate of clutch engagement and, therefore, control the rate torque is applied to the driveline.

It should be appreciated that the term "clutch pedal" as used herein is intended to be broadly construed, and the invention is not intended to be restricted merely to a device in a vehicle cab. One of ordinary skill will appreciate that, of course, the clutch pedal dashpot 14 could be positioned in numerous other places. For example, the dashpot 14 could be positioned on the clutch release arm if the clutch were a self-adjusting clutch.

It is understood, of course, that while the forms of the invention herein shown and described constitute the preferred embodiments of the invention, they are not intended to illustrate all possible forms thereof. It will also be understood that the words used are words of description rather than limitation, and that various changes may be made without departing from the spirit and scope of the invention as recited by the following claims.

What is claimed is:

1. A clutch pedal dashpot for use in a vehicle including a clutch pedal and a clutch mechanism for coupling an engine to a driveline, the clutch pedal being displaced between a first position and a second position, the clutch pedal dashpot for controlling the rate of torque applied to the driveline during coupling, the clutch pedal dashpot comprising:
    a housing;
    a damper piston disposed within the housing, the damper piston being adapted to be coupled to the clutch pedal, the damper piston controlling the rate at which the clutch pedal returns to the first position from the second position during coupling so as to control the rate of clutch engagement, thereby controlling the rate of torque applied to the driveline;
    a damper piston stop member disposed within and fixedly attached to the housing, the stop member limiting travel of the damper piston within the housing to affect coupling of the damper piston to only a portion of the possible travel of the clutch pedal from the first position to the second position; and
    bias means, disposed between the housing and the damper piston, for biasing the damper piston toward the stop member during displacement of the clutch pedal from the first position to the second position;
    the damper piston sealingly cooperating with the housing to create a chamber, the clutch pedal dashpot including valve means for allowing air to be drawn into the chamber as the pedal is displaced from the first position to the second position and impeding air from being expelled from the chamber as the pedal is displaced from the second position to the first position.

2. The clutch pedal dashpot of claim 1 wherein the damper piston is displaced from a rest position to a reset position at a rate which exceeds the rate at which the damper piston returns to the rest position, as the clutch pedal is displaced between the first position and the second position.

3. A clutch pedal dashpot for use in a vehicle including a clutch pedal, a master clutch cylinder and a clutch mechanism for coupling an engine to a driveline, the clutch pedal being displaced between a first position and a second position, the clutch pedal dashpot for controlling the rate of torque applied to the driveline during coupling, the clutch pedal dashpot comprising:
    a housing adapted for being affixed to the master clutch cylinder;
    a damper piston disposed within the housing, the damper piston being adapted for being coupled to the clutch pedal for allowing axial travel within the housing as the clutch pedal is displaced between the first and second positions;
    a damper piston stop member disposed within and fixedly attached to the housing, the stop member limiting travel of the damper piston within the housing during displacement of the clutch pedal between the first and second positions;
    a spring, disposed between the housing and the damper piston, for biasing the damper piston against the stop member during displacement of the clutch pedal between the first and second positions;
    wherein the damper piston sealingly cooperates with the housing to create a chamber, the housing including a one-way check valve and a passage for allowing air to be drawn into and expelled from the chamber at different rates as the pedal is displaced between the first position to the second position, the spring, the check valve and the passage cooperating to control the rate at which the clutch pedal returns to the first position from the second position during coupling so as to control the rate of clutch engagement, thereby controlling the rate of torque applied to the driveline.

4. The clutch pedal dashpot of claim 3 wherein the one-way check valve impedes air from being expelled from the chamber and wherein the passage allows air to be expelled from the chamber as the pedal is displaced from the second position to the first position.

5. The clutch pedal dashpot of claim 3 wherein the one-way check valve and the passage are arranged such that air enters the chamber at a rate which exceeds the rate at which air is expelled from the chamber, thereby allowing the damper piston to be quickly reset to the damper piston stop member as the clutch pedal is displaced to the second position.

6. The clutch pedal dashpot of claim 3 wherein the damper piston is displaced from a rest position to a reset position at a rate which exceeds the rate at which the damper piston returns to the rest position, as the clutch pedal is displaced between the first position and the second position.

7. A method, for use in a vehicle including a clutch pedal and a clutch mechanism for coupling an engine to a driveline, for controlling the rate of torque applied to the driveline, the clutch pedal being displaced between a first position and a second position, the method comprising:

providing a housing including a one-way check valve and a passage for allowing air to be drawn into and expelled from the chamber at different rates as the pedal is displaced between the first position to the second position;

positioning a damper piston within the housing, the damper piston being coupled to the clutch pedal and being axially displaced within the housing during displacement of the clutch pedal between the first and second positions;

positioning a damper piston within and fixedly attached to the housing, the stop member limiting travel of the damper piston within the housing during displacement of the clutch pedal between the first and second positions; and positioning a spring between the housing and damper piston, the spring for biasing the damper piston against the stop member during displacement of the clutch pedal between the first and second positions, the damper piston being positioned so as to sealingly cooperate with the housing to create a chamber, the spring, the check valve and the passage cooperating to control the rate at which the clutch pedal returns to the first position from the second position during coupling so as to control the rate of clutch engagement, thereby controlling the rate of torque applied to the driveline.

8. The method of claim 7 wherein the check valve is a one-way check valve which impedes air from being expelled therethrough from the chamber as the pedal is displaced from the second position to the first position.

9. The method of claim 8 wherein the step of providing a housing includes the step of arranging the one-way check valve and the passage so as to allow the damper piston to be displaced from a rest position to a reset position at a rate which exceeds the rate at which the damper piston returns to the rest position, as the clutch pedal is displaced between the first position and the second position.

* * * * *